Nov. 9, 1971  M. R. EDWARDS ETAL  3,618,253

FISHING APPARATUS

Filed March 2, 1970  2 Sheets-Sheet 1

INVENTORS
Marshall R. Edwards
David M. Edwards
BY

*Hastings Ackley*
ATTORNEY

Nov. 9, 1971  M. R. EDWARDS ETAL  3,618,253
FISHING APPARATUS
Filed March 2, 1970  2 Sheets-Sheet 2
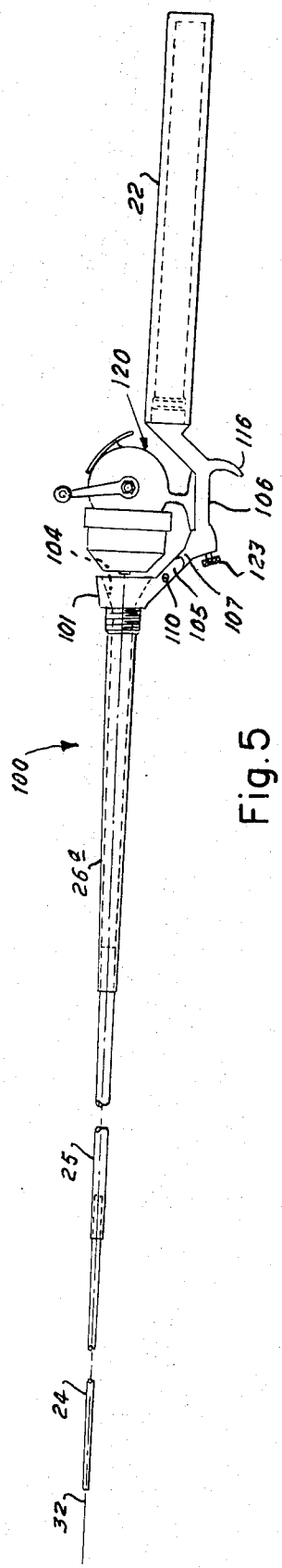
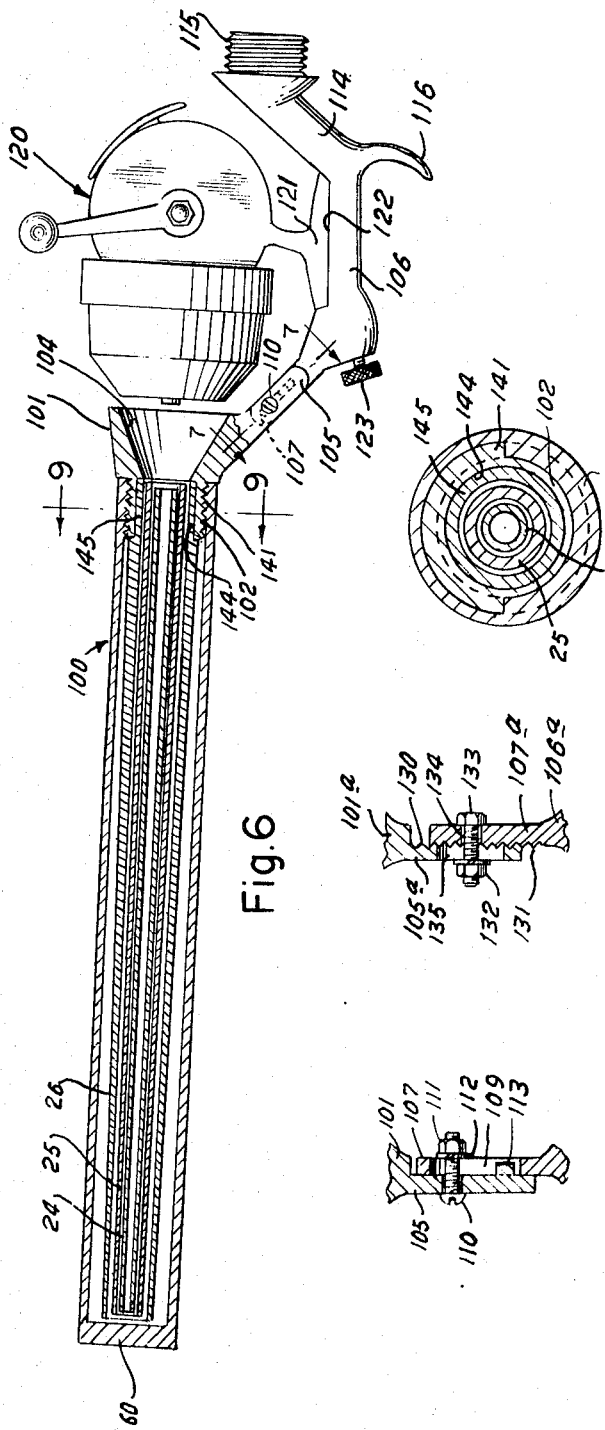
INVENTORS
Marshall R. Edwards
David M. Edwards
BY
E. Hastings Ackley
ATTORNEY United States Patent Office 3,618,253
Patented Nov. 9, 1971

3,618,253
FISHING APPARATUS
Marshall R. Edwards, P.O. Box 42, Gonzales, La. 70737, and David M. Edwards, P.O. Box 825, Willis, Tex. 77378
Filed Mar. 2, 1970, Ser. No. 15,598
Int. Cl. A01k 87/04, 87/06, 97/08
U.S. Cl. 43—26
24 Claims

ABSTRACT OF THE DISCLOSURE

A collapsible fishing rod comprising telescoping tapered tubular sections through which a fishing line passes from a reel mounted in substantial alignment with the passageway through the rod. For storage the hollow handle of the fishing rod is removed and placed over the collapsed telescoped rod sections and made fast. In one embodiment, the rod is provided with reel seat means variably offset from the axis of the rod in order that various types of reels may be secured thereon in substantial alignment with the opening through the tubular rod.

---

This invention pertains to fishing rods and more particularly to a collapsible tubular fishing rod having means for aligning a reel mounted thereon with the hollow bore of the rod and having a hollow handle which is adapted to be removed from its position on the reel seat and positioned to house and protect the collapsed rod when the rod is not in use.

One object of this invention is to provide an improved fishing rod which may be collapsed to only a fraction of its extended length for ease of storage and transport.

Another object is to provide such a fishing rod having a hollow handle which is telescopingly mountable over the collapsed rod to enclose the collapsed sections when said rod is not in use.

A further object is to provide an improved fishing rod of colapsible tubular construction wherein the fishing line is reeled in and out through the bore or line passageway of the hollow rod, the reel being disposed to substantially align the line fed therefrom with the passageway through the rod.

Another object is to provide a fishing rod of the type described wherein the reel comprises a casting adapted for attachment to the rearward end of the tubular portion of the fishing rod with the line storage means thereof disposed to feed and take up the fishing line in alignment with the hollow bore of the tubular rod.

Another object is to provide an improved tubular fishing rod having means for mounting reel means thereon in a position to feed and take up the fishing line in substantial alignment with the hollow of the tubular portion of the fishing rod.

Another object is to provide such a rod having reel seat means variably offset with respect to the rod axis in order that reels of various sizes or types mounted thereon may be brought into substantial alignment with the hollow of the tubular portion of the fishing rod.

Another object is to provide an improved rod and reel combination, wherein the reel housing forms a means for connecting the hollow rod with the hollow handle and acts as a part of the handle to provide a unitary rod, reel and handle structure, and the line is enclosed therein.

Other objects and advantages will become apparent from reading the description which follows and from studying the accompanying drawings wherein:

FIG. 5 is a view similar to FIG. 1 showing a second embodiment of the invention having means for mounting various reels thereon with the line storage means thereof disposed to feed and take up the line in substantial alignment with the hollow of the tubular rod;

FIG. 6 is a view showing the rod of FIG. 5 in collapsed telescoped condition ready for storing;

FIG. 7 is an enlarged fragmentary cross-sectional view taken along the line 7—7 of FIG. 6;

FIG. 8 is a cross-sectional view similar to FIG. 7 showing a modified reel seat adjusting means; and FIG. 9 is an enlarged cross-sectional view taken along the line 9—9 of FIG. 6.

Figure 1:
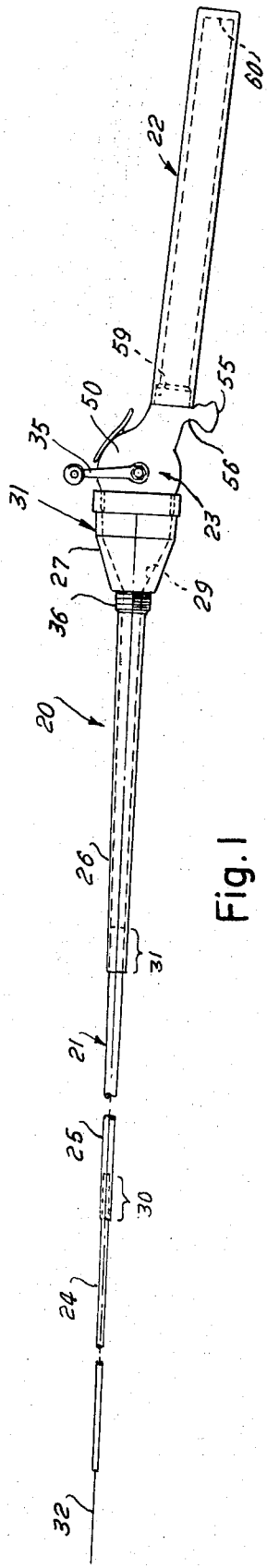
FIG. 1 is a side elevation of a fishing rod constructed in accordance with this invention.
Figure 2:
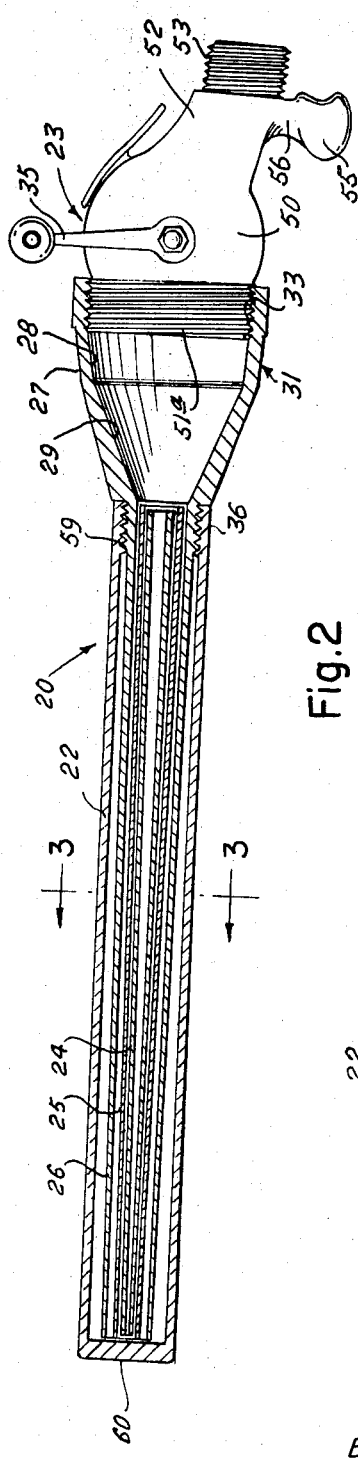
FIG. 2 is a side view, partly in section and partly in elevation, showing the fishing rod of FIG. 1 collapsed and with the hollow handle in position for housing the collapsed rod sections.
Figure 3:
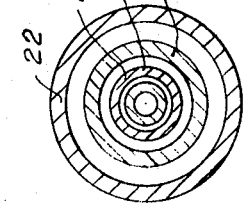
FIG. 3 is a cross-sectional view taken along line 3—3 of FIG. 2.

Referring now to FIGS. 1 through 3 of the drawings, the fishing rod assembly indicated generally by the numeral 20 comprises a hollow or tubular rod portion 21 and a handle 22 connected together by a reel 23, such as a spinning or spin-cast reel.

The hollow or tubular portion 21 of the rod is composed of a plurality of interfitting telescoping tubular sections such as the smallest or tip, intermediate, and largest or base sections 24, 25 and 26, respectively, although any number of sections could be employed. Preferably, each section is tapered uniformly over its entire length and, ideally, both the bore and the bore wall are tapered to more efficiently distribute and resist the bending stresses developed in the fishing rod as a result of loads applied transversely laterally thereto. These tubular sections are assembled one inside the other, telescope fashion, as seen in FIG. 3, the large end of the smallest or tip section 24 being slightly larger than the small end of the bore of the intermediate tubular section 25. Similarly, the large end of the intermediate section 25 is larger than the small end of the bore of the largest or base section 26. Thus, when the fishing rod is extended, as by moving the smallest section away from the largest section, adjacent sections will jam or frictionally engage and stick with only a relatively small portion of one remaining inside the other. Thus, adjacent sections overlap as at 30 and 31.

The overlapping portions of adjacent rod sections should be sufficiently long in their telescoping engaging portions to provide adequate strength but not so long as to impair the "whip action" of the fishing rod nor to cause undue concentration of stresses at those points.

To collapse the fishing rod, the smallest or tip section 24 is forced axially towards intermediate section 25, which is then forced towards the base section 26. In the thus collapsed or telescoped condition, the fishing rod is only a fraction, approximately one-third, of its extended length.

If desired, the small outer or tip end of the tip section may be flared or provided with an annular bead to reduce line drag at that point and thus extend the useful life of the line.

The rearward end of the largest or base tubular section 26 is enlarged as at 27 and its bore 28 is flared as at 29 and at 29b to provide a funnel-like guide 31 for the fishing line 32 as it moves through the tubular rod to and from the reel 23. The outer end of the flared bore 28 is internally threaded as at 33 for attachment of a mating externally threaded boss 51a on the forward end of a reel chassis or housing 50 which carries the line winding and storage means (not shown) of a spin-cast type reel 23 operated by the crank 35. When the boss 51a of the reel chassis 50 is attached to the line guide or funnel 31, the line storage means thereof is disposed substantially in alignment with the hollow or bore of the tubular fishing rod, thus assuring ready entry of the line into and exit out of the base of the rod and minimizing the drag of the fishing line at the rearward end of the tubular portion 21 of the fishing rod.

The reel chassis or housing 50 may be formed of any suitable material; such as being cast of aluminum or other suitable material. It is formed with a tang portion 52 extending rearwardly and, preferably, slightly downwardly at an angle of about 2 to 10 degrees, 4 to 6 degrees being considered most desirable.

The tang 52 of the chassis terminates with a threaded boss portion 53 for attachment of the hollow tubular handle 22, which is internally threaded as at 59 at its inner open end and preferably closed at its rear extremity 60 to provide a tubular storage compartment for covering the telescoped or collapsed rod sections 24, 25 and 26, as will hereinafter be explained.

The tang 52 of the reel chassis 50, if desired, may be provided with a finger hook 55 which projects generally downwardly and has a suitably curved concave front hook surface 56 engageable by the fisherman's forefinger as he grips the handle to provide a better hold on the rod and to assure better control during the manipulation thereof.

Immediately forward of the guide funnel 31, the largest or base rod section 26 is provided with an externally enlarged portion having external threads 36 having a diameter greater than that of the adjacent tubular portion of the rod extending forwardly therefrom, and this threaded portion is adapted to receive and be engaged by the internal threads 59 of the hollow handle 22 when the handle is removed from its usual place at the rear of the rod and its open end telescoped over the now collapsed rod sections. Thus installed, as shown in FIG. 2, the handle houses and protects the collapsed or telescoped rod sections. In the thus collapsed condition, the rod assembly 20 is at its shortest length and can be carried in a suitable tackle box or under the seat of a boat or automobile.

When the handle is in its usual place at the rear of the reel, small articles such as sinkers, hooks, bait and the like can be stored therein. Weights can also be placed in the handle, if necessary, to provide the "balance" desired.

Figure 4:
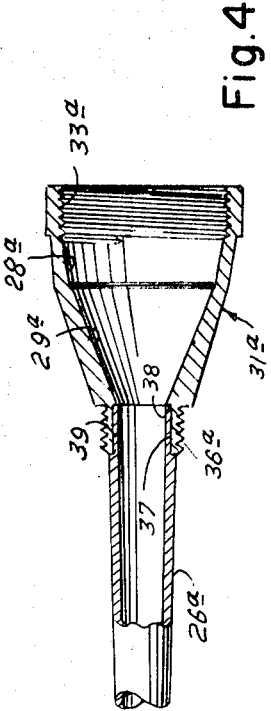
FIG. 4 is a fragmentary view, partly in section and partly in elevation, of a modified form of the invention wherein the inner tubular rod section and the guide means on the rearward end thereof are made in separate pieces.

It may be desirable to form the tubular rod sections and the guide of dissimilar materials. For instance, it may be desired to form the guide of cast aluminum or magnesium and to form the rod sections of plastic, such as Fiberglas or of steel. If so, the structure shown in FIG. 4 illustrates an example of the manner in which this structure may be formed. In this form, the guide member 31a is shaped exactly like the corresponding guide funnel portion 31 shown in FIGS. 1 and 2, having a rearwardly flared bore 29a, 28a terminating with an internal thread 33a by which the chassis 50 of reel 23 is attached thereto.

The forward end of the guide member 31a is formed with an externally reduced stub portion 36a which is externally threaded for attachment of the hollow handle 22 by means of the threads 59 at its open end to cover and protect the rod sections, as before explained. This threaded stub portion 36a is counterbored as at 37 leaving a forwardly facing internal annular stop shoulder 38. The largest or base rod section 26a is provided at its large base end with a reduced diameter portion 39 whose length and diameter closely fit within the counterbore 37 of the guide member with a tight friction fit when assembled as shown in FIG. 4. If these two members are to be permanently joined, they need not fit quite so tightly, and the joint may be made secure by such means as soldering, epoxy cement or the like, depending upon the structural materials used.

It will thus be seen that a unitary rod, reel and handle structure has been provided wherein the reel housing forms a connection between the rod and handle and the line is covered in the housing and rod and is fed directly between the reel and the base of the rod and vice versa.

Another embodiment of the invention is illustrated in FIGS. 5 through 9. In these views, the fishing rod assembly is indicated generally by the numeral 100. This embodiment differs from the forms shown in FIGS. 1 through 4 in that it is usable with a variety of conventional reels presently available for plug casting, spin casting, still fishing and the like.

This form of the invention comprises a plurality of interfitting, telescoping, tapered tubular rod sections as in the first described embodiment. Again, for convenience of illustration and explanation, three sections are shown. The small or tip and the intermediate sections are assigned the numerals 24 and 25, respectively, since they may be exactly like the sections 24 and 25 of the first embodiment, and the largest or base section 26a is identical to the base section 26a of FIG. 4. If desired, however, this base section may be constructed so that its rearward end is formed integral with a rear guide or funnel and shank portion 101 having a bore 104 which is flared rearwardly to form a guide or funnel for fishing line 32 as it enters and leaves the hollow rod to and from the reel 120.

As shown in FIG. 6, the largest or base rod section 26a and the guide carried by it are formed separately as shown in FIG. 4, even of dissimilar materials, and afterwards assembled permanently or otherwise, as before explained.

The guide and shank portion 101 includes an axially projecting stub or boss 102 having a counterbore 144 formed therein for receiving the reduced diameter section 145 with the end thereof abutting the shoulder at the inner end of the counter bore and the outer end of the stub abutting the shoulder between the reduced and large portions of the base section of the rod. Thus, the bore of the base section 26a of the rod communicates axially with the flared bore 104 of guide funnel and shank portion 101.

The guide and shank section 101 has an integral flat shank 105 extending downwardly and rearwardly therefrom and, similarly, the reel seat member 106 is formed with a mating flat shank 107 at its forward end extending upwardly and forwardly from the reel seating surface 122 of the seat member. The guide shank 105 is provided with a bolt aperture 108 and the seat shank 107 is provided with a similar elongate longitudinal aperture 109, and a bolt 110 passes through these apertures when the shanks are disposed in longitudinally overlapping abutting engagement with the apertures overlying each other. The joint is made secure by tightening a retaining clamping nut 111 on the bolt and against a lock washer 112. The shank 105 of the guide member is provided with a lug 113 spaced from the bolt aperture 108 and this lug engages in the elongate longitudinal aperture 109 in the seat shank, as shown in FIG. 7, to prevent relative pivotal movement of the shanks about the axis of the bolt, even when the clamping nut 111 is loose. The elongated aperture 109 should be sufficiently long to provide a suitable range of adjustments so that this slip-joint connection can be varied in length to bring any suitable or usually commercially available reel mounted on the seat member 106 into proper alignment with the hollow rod. Once the adjustment has been made for a particular reel, it need not be repeated even when the reel is later removed and remounted. Further adjustment will be required only when a reel of different dimension is mounted on the fishing rod.

Any suitable reel, such as a spinning or spin-cast reel 120 is attached to the fishing rod assembly 100 by placing its lower seating portion or mounting bracket 121 in engagement with the seat surface 122 of the seat member 106 and then tightening the retaining screw 123 which is threaded through the seat member to engage and lock the seating bracket of the reel to the seat member in the usual manner. Loosening the screw 123 will release the reel for easy removal from the rod assembly.

FIG. 8 shows a modified form of adjustable or slip-joint connection with which the positioning of the reel relative to the hollow of the rod is more reliably preserved. In this modification, the guide shank 105a and the seat shank 106a are provided with transverse teeth or serrations 130 and 131, respectively, which coengage to prevent relative longitudinal movement between the shanks when the bolt 133 and clamp nut 132 are tightened. Adjustment of the modified slip-joint connection to substantially align the reel with the rod is accomplished, as before. by loosening the clamping nut 132 on the bolt 133 sufficiently to permit disengagement of the serrations 130 and 131 so that one shank is movable longitudinally relative to the other, as permitted by the elongate aperture 135, after which the clamping nut is retightened to positively reengage the teeth or serrations of the shanks and hold the shanks in their adjusted position.

The pitch of the teeth or serrations 130 and 131 should be sufficiently small to provide for adjustment of the shanks in suitably small increments. A pitch of 0.10″ will will provide changes in reel position transversely of the axis of the hollow rod approximating 1/16 inch, depending upon the angle of incline of the shanks.

During longitudinal movement between the shanks while adjustments are being made, the bolt 133 disposed in the bolt aperture 134 of seat shank 106a slides in the elongate longitudinal slot 135 formed in the guide shank 105a. If desired, both shanks could be slotted. It is understood that, instead of a slotted, slip-joint arrangement, either or both shanks could be provided with a series of holes to permit securing them together with one or more bolts, but this structure would necessitate disassembly of the bolt and clamping nut in order to make adjustments in position of the shanks. A slip-joint connection such as those of FIGS. 7 and 8 is much to be preferred.

The seat member 106 is formed with a rear portion 114 extending upwardly and rearwardly and terminating with a threaded boss 115 for attachment of the hollow handle 22 which, as was before explained, may serve as a storage compartment for small articles when attached to the seat member as shown in FIG. 5, and which serves as a protective case for the telescoped rod sections when attached to the external threads 141 of the stub or boss 102 on the forward end of the guide member 101 as shown in FIG. 6, thus covering and retaining and protecting rod sections in collapsed telescoped position.

Preferably, the seat member 106 is formed with a trigger-shaped downwardly projecting finger hook 116 on its under side, substantially as shown, to receive the forefinger of the fisherman holding the rod by the handle to make his grasp more certain and to permit more accurate manipulation of the rod.

Thus, a collapsible fishing rod comprising interfitting telescoping tapered tubular rod sections has been provided which is fitted with a reel substantially aligned with the bore of the hollow rod throguh which the fishing line is reeled in and out, and that such rod is provided with a detachable hollow handle in which small articles can be stored, which handle can also be telescoped over the collapsed rod sections and secured in place to hold the rod sections in such collapsed position and protect them against dirt and damage. Also, it will be seen that the reel may be formed as a part of the connection between the handle and rod to provide a uintary rod, reel and handle structure. It has also been shown that such a collapsible fishing rod can be provided with seat means adjustable in position for mounting reels varying in mounting height to align such reels with the hollow bore of the rod to provide more drag-free operation of the assembly. Further, it has been shown that such adjustment can be accomplished readily by provision of a slip-joint connection between the reel seat means and the rod; that this adjustment can be preserved simply by tightening a clamping nut on a bolt passing through the joint; and that the reliability of this arrangement can be greatly enhanced by providing mating serrations on the engaging surfaces of the joint to positively prevent slippage as long as the nut provides no slack.

It will particularly be noted that the fishing rod assembly of both forms illustrated and described is designed to support the reel in a position in which the fishing line wound on the reel may move substantially collinearly through the annular tapered guide surface of the guide member and into and out of the bores of the tubular rod sections to provide for free flow of the fishing line and prevent wear thereof.

The foregoing description of the invention is explanatory only, and changes in the details of the constructions illustrated may be made by those skilled in the art, within the scope of the appended claims, without departing from the spirit of the invention.

What is claimed and desired to be secured by Letters Patent is:

1. A collapsible fishing rod assembly comprising: a plurality of telescopically interfitting tubular sections, each section being substantially uniformly tapered throughout its length; guide means on the rearward end of the largest tubular section and having an annular guide surface; a tubular handle; means releasably connecting said tubular handle to said largest tubular section to extend substantially rearwardly therefrom; reel support means on the connecting means for holding a reel in substantial alignment with said guide means; and means on said largest tubular section adapted to releasably receive said tubular handle in position housing said tubular sections in collapsed condition.

2. The fishing rod assembly of claim 1 wherein a reel is mounted on said reel support means in a position in which a fishing line wound on said reel may move substantially collinearly through said annular guide surface into and out of the bores of said tubular sections.

3. The fishing rod assembly of claim 1 wherein the connection between the reel support means and the largest tubular section is releasable.

4. The fishing rod assembly of claim 1 wherein the guide means is formed integral with the largest tubular section.

5. The fishing rod of claim 1 wherein the guide means and the largest tubular section are formed in separate pieces and are provided with coengageable means for securing the same together.

6. The fishing rod of claim 5 wherein the guide means and the largest tubular section are formed of dissimilar materials.

7. The fishing rod assembly of claim 1 wherein the means connecting said reel support means to said guide means is adjustable to position the reel to provide collinearity of the fishing line with the bores of the tubular sections.

8. The fishing rod assembly of claim 1 wherein the reel support means comprises a chassis for supporting a reel enclosed therein and said chassis provides a connection between said tubular handle and said guide means.

9. A telescopic fishing rod assembly comprising: a rod formed of a plurality of telescopically interfitting tubular sections, each section being substantially uniformly tapered throughout its length, said sections being movable to an extended position wherein end portions of adjacent sections are frictionally engaged providing a small diameter tip end and a large diameter base end and a contracted position wherein said sections are telescoped, the communicating bores of said tubular sections providing a passageway for a fishing line passing therethrough; guide means disposed at the base end of the largest of said tubular sections providing an annular tapered guide surface to guide the fishing line into and from the base end of said bores; reel support means; means connecting said reel support means to said guide means to support a reel in a position in which a fishing line may pass freely substantially collinearly with the bore of the rod between said reel and said largest tubular section; a handle having an elongated longitudinal recess therein and connecting means at the open end of said recess for releasably attaching said handle to the end of said reel support means opposite said rod; and connecting means disposed at the base end portion of said largest tubular section and coengageable with said connecting means on said handle to releasably secure said handle to said connecting means when said handle is disconnected from said reel support means and is telescoped over the tubular sections in their contracted position to confine and protect said tubular sections in said contracted position in the recess of said handle.

10. A telescopic fishing rod assembly comprising: a rod formed of a plurality of telescopically interfitted tubular sections, each section being substantially uniformly tapered throughout its length, said sections each having friction means at its ends adjacent mating ends of adjacent sections coengageable with the mating ends of said adjacent sections when said sections are moved to extended position, said friction means on the ends of adjacent sections frictionally engaging each other to releasably hold said sections in extended positions providing a small diameter tip end and a large diameter base end; said friction means being disengageable to permit said sections to be moved to a contracted position wherein said sections are telescoped; said tubular sections providing a passageway for a fishing line therethrough; guide means disposed at the base end of the largest of said tubular sections providing an annular tapered guide surface for guiding the fishing line into and from the base end of said bores; reel support means; means connecting said reel support means to said guide means to support a reel in a position in which a fishing line may pass freely substantially collinearly with the bore of the rod through said guide means between said reel and said largest tubular section; a handle and cover member having an elongate longitudinal recess therein and connecting means at the open end of said recess for releasably attaching said handle and cover member to the end of said reel support means opposite said rod for manipulation of said rod; and connecting means disposed at the base end portion of said largest tubular section and coengageable with said connecting means on said handle and cover member to releasably secure said handle and cover member to said connecting means when said handle and cover member is disconnected from said reel support means and is telescoped over the tubular sections in their contracted position to confine and protect said tubular sections in said contracted position in the recess of said handle and cover member.

11. The fishing rod assembly of claim 10 in combination with a reel mounted on said reel support means in a position in which a fishing line wound on said reel may move substantially collinearly through said annular guide surface into and out of the bores of said tubular sections.

12. The fishing rod assembly of claim 10 wherein the connection between the reel support means and the largest tubular section is releasable.

13. The fishing rod assembly of claim 10 wherein the guide means is formed integral with base of the largest tubular section.

14. The fishing rod assembly of claim 10 wherein the guide means and the largest tubular section are formed in separate pieces and are provided with coengageable means for securing the same together.

15. The fishing rod assembly of claim 10 wherein the means connecting said reel support means to said guide means is adjustable to dispose a reel mounted on said reel support means in a position in which a fishing line wound on said reel may move substantially collinearly through the guide means into and out of the bore of the tubular rod.

16. The fishing rod assembly of claim 10 wherein the reel support means comprises a chassis for supporting a reel enclosed therein and said chassis provides a connection between said handle and said guide means.

17. A telescopic fishing rod assembly comprising: a rod formed of a plurality of telescopically interfitting tubular rod sections, each section being substantially uniformly tapered throughout its length, said sections being movable to an extended position wherein end portions of adjacent sections are frictionally engaged providing a small diameter tip end and a large diameter base end and a contracted position wherein said sections are telescoped, the communicating bores of said tubular sections providing a passageway for a fishing line passing therethrough; guide means disposed at the base end of the largest of said tubular sections providing a anunlar tapered guide surface to guide a fishing line into and from the base end of said bores; reel support means; means connecting said reel support means to said guide means; said reel support means havign a reel seating portion offset from the longitudinal axis of the bore of said tubular sections whereby a reel seated therein will be disposed in a position in which a fishing line may pass freely substantially collinearly through the bore of said tubular rod; a handle having an elongate longitudinal recess therein and connecting means at the open end of said recess for releasably attaching said handle to the end of said reel support means opposite said rod; and connecting means disposed at the base end portion of said largest tubular section and coengagebale with said connecting means on the open end of said handle to releasably secure said handle to said connecting means when said handle is disconnected from said reel support means and is telescoped over the tubular sections in their contracted position to confine and project said tubular sections in said contracted position in the recess of said handle.

18. The fishing rod assembly of claim 17 wherein the connection between the reel support means and the largest tubular section is releasable.

19. The fishing rod assembly of claim 18 wherein the guide means is formed integral with the largest tubular section.

20. The fishing rod assembly of claim 17 wherein the guide means and the largest tubular section are formed in separate pieces and are provided with coengageable means for securing the same together.

21. The fishing rod assembly of claim 17 wherein the means connecting said reel support means to said guide means is adjustable to dispose a reel mounted on the reel support means in a position in which a fishing line wound on said reel may move substantially collinearly through the bore of the tubular rod.

22. The fishing rod assembly of claim 21 wherein said adjustable connecting means comprises: first shank means formed on said guide means and extending rearwardly and downwardly therefrom; second shank means formed on said reel support means and extending forwardly and upwardly from the offset reel seating portion thereof, said first and second shank means having surfaces adapted to coengage when said shanks are longitudinally aligned and moved to a position wherein said coengageable surfaces overlap, said shank means being movable longitudinally relative to each other to dispose a reel mounted on said reel seating surface in a position wherein the fishing line is disposed substantially collinearly with the bore of said rod between said reel and said largest tubular section; and tightenable clamping means engageable with said shank means to secure them against relative longitudinal movement between said shanks after said reel has been aligned relative to said tubular rod.

23. The fishing rod assembly of claim 22 wherein said coengageable surfaces of said first and second shank means are formed with transversely disposed complementary serrations coengageable when said clamping means is tightened to prevent relative longitudinal movement between said guide means and said reel support means to maintain a reel supported on said reel support means in a position in which a fishing line wound on said reel may move substantially collinearly with the bore of said rod.

24. The fishing rod assembly of claim 22 wherein the coengageable surfaces of said first and second shank means are formed with a lateral recess on one and a laterally projecting lug on the other of said first and second shank means, said recess and said lug being coengageable to prevent relative pivotal movement between said first and second shank means in the plane of the coengageable surface thereof.

References Cited

UNITED STATES PATENTS

| | | | |
|---|---|---|---|
| 359,153 | 3/1887 | Horton | 43—18 |
| 2,729,012 | 1/1956 | Lee | 43—18 |
| 2,787,484 | 4/1957 | Macy | 43—18 X |
| 3,417,500 | 12/1968 | Carabasse | 43—18 |

WARNER H. CAMP, Primary Examiner

U.S. Cl. X.R.

43—18, 22, 23, 24